(12) United States Patent
Mielewski et al.

(10) Patent No.: US 8,197,924 B2
(45) Date of Patent: Jun. 12, 2012

(54) COMPOSTABLE INTERIOR PANEL FOR USE IN A VEHICLE AND METHOD OF MANUFACTURE

(75) Inventors: Deborah Frances Mielewski, Ann Arbor, MI (US); Angela Marie Harris, Allen Park, MI (US); Ellen Cheng-chi Lee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/898,156

(22) Filed: Oct. 5, 2010

(65) Prior Publication Data

US 2011/0165414 A1  Jul. 7, 2011

(51) Int. Cl.
*B32B 7/00* (2006.01)
*B32B 7/02* (2006.01)
*B32B 27/20* (2006.01)
*B32B 27/32* (2006.01)
*B32B 27/36* (2006.01)

(52) U.S. Cl. ............ 428/76; 428/68; 428/212; 428/325; 428/480; 428/483; 428/500; 264/328.1; 264/328.12; 264/328.16; 264/328.17; 264/330; 264/330.11

(58) Field of Classification Search .................. None
See application file for complete search history.

(56) References Cited

U.S. PATENT DOCUMENTS

| 3,339,240 | A | * | 9/1967 | Corbett | 425/130 |
| 4,174,413 | A | * | 11/1979 | Yasuike et al. | 428/35.7 |
| 5,091,262 | A | * | 2/1992 | Knott et al. | 428/516 |
| 5,108,807 | A | * | 4/1992 | Tucker | 428/35.2 |
| 5,202,074 | A | * | 4/1993 | Schrenk et al. | 264/241 |
| 5,216,050 | A | * | 6/1993 | Sinclair | 524/108 |
| 5,314,754 | A | * | 5/1994 | Knight | 428/532 |
| 5,336,457 | A | * | 8/1994 | Wu et al. | 264/173.14 |
| 5,380,479 | A | * | 1/1995 | Schrenk et al. | 264/241 |
| 5,391,423 | A | * | 2/1995 | Wnuk et al. | 428/217 |
| 5,540,962 | A | * | 7/1996 | Suskind | 428/34.2 |
| 5,545,485 | A | * | 8/1996 | Hashitani et al. | 428/423.1 |
| 5,755,883 | A | | 5/1998 | Kinose et al. | |
| 5,820,808 | A | * | 10/1998 | van Oene et al. | 264/328.12 |
| 5,833,913 | A | * | 11/1998 | Ellwood et al. | 264/328.7 |
| 5,849,374 | A | * | 12/1998 | Gruber et al. | 428/34.3 |
| 5,849,401 | A | * | 12/1998 | El-Afandi et al. | 428/215 |
| 6,046,577 | A | * | 4/2000 | Rincon-Mora et al. | 323/282 |
| 6,312,823 | B1 | * | 11/2001 | El-Afandi et al. | 428/480 |
| 6,663,966 | B2 | | 12/2003 | Mhetar | |

(Continued)

FOREIGN PATENT DOCUMENTS

EP 2 028 219 * 2/2009

(Continued)

OTHER PUBLICATIONS

Reddy, Narendra et al., Polymer Degradation and Stability, 93,, 2008, pp. 233-241.

(Continued)

*Primary Examiner* — Vivian Chen
(74) *Attorney, Agent, or Firm* — Damian Porcari; Brooks Kushman, P.C.

(57) ABSTRACT

A compostable interior panel for use in a vehicle includes an injection molded compostable polymer. A layer is disposed about the compostable polymer and comprises a composting-resistant polymer having a thickness ranging from 10 μm to 175 μm. The compostable polymer and the composting-resistant polymer are substantially insoluble in one another when liquid.

20 Claims, 3 Drawing Sheets

U.S. PATENT DOCUMENTS

| | | | |
|---|---|---|---|
| 6,713,140 B2 * | 3/2004 | McCormack et al. | 428/36.6 |
| 6,828,371 B2 * | 12/2004 | Lee et al. | 524/445 |
| 6,844,077 B2 * | 1/2005 | Squier et al. | 428/457 |
| 6,869,985 B2 * | 3/2005 | Mohanty et al. | 523/124 |
| 6,878,199 B2 * | 4/2005 | Bowden et al. | 106/162.5 |
| 7,097,074 B2 | 8/2006 | Halliday et al. | |
| 7,256,223 B2 * | 8/2007 | Mohanty et al. | 523/124 |
| 7,368,496 B2 * | 5/2008 | Kim et al. | 524/445 |
| 7,619,025 B2 * | 11/2009 | Mohanty et al. | 524/445 |
| 7,854,994 B2 * | 12/2010 | Henderson-Rutgers et al. | 428/480 |
| 7,901,764 B2 * | 3/2011 | Takase et al. | 428/314.8 |
| 7,943,218 B2 * | 5/2011 | Knoerzer et al. | 428/35.4 |
| 7,951,438 B2 * | 5/2011 | Lee et al. | 428/35.8 |
| 7,959,886 B2 * | 6/2011 | Yamada et al. | 423/326 |
| 7,977,397 B2 * | 7/2011 | Cheung et al. | 521/134 |
| 2006/0292323 A1 | 12/2006 | Hutchinson et al. | |
| 2007/0298237 A1 * | 12/2007 | Goino et al. | 428/304.4 |
| 2009/0270524 A1 * | 10/2009 | Oka et al. | 521/138 |
| 2009/0312462 A1 * | 12/2009 | Oakley et al. | 524/47 |

FOREIGN PATENT DOCUMENTS

| | | | |
|---|---|---|---|
| JP | 05-305626 | * | 11/1993 |
| JP | 06-297494 | * | 10/1994 |
| JP | 11-082588 | * | 3/1999 |
| JP | 2000-225629 | * | 8/2000 |
| JP | 2007145912 A | | 6/2007 |
| WO | 2006059984 A1 | | 6/2006 |

OTHER PUBLICATIONS

Mielewski, Deborah Frances, Weld Line Morphology of Injection Molded Polypropylene, 1998, Chapter 1, pp. 8-17.

Mielewski, Deborah Frances, Weld Line Morphology of Injection Molded Polypropylene, 1998, Chapter 4, pp. 94-125.

Mielewski, Deborah Frances, Weld Line Morphology of Injection Molded Polypropylene, 1998, Chapter 5, pp. 127-135.

* cited by examiner

COMPOSTABLE INTERIOR PANEL FOR USE IN A VEHICLE AND METHOD OF MANUFACTURE

BACKGROUND

1. Technical Field

The present disclosure relates to a compostable interior panel for use in a vehicle and method of manufacture.

2. Background Art

Polylactic acid (PLA) is a compostable polymer that is derived from renewable resources. PLA can have good mechanical properties, but PLA lacks properties suitable for use in vehicle interior panels demanding relatively good impact performances and relatively great durability. PLA tends to be affected by heat and moisture because of the consequent hydrolysis of the PLA's ester linkages.

PLA may have enhanced performance and durability when formulated with additional fillers modifiers and stabilizers. But, those formulations reduce PLA's compostability.

It is desirable to have a manufacturable, relatively inexpensive, and compostable material having the performance and durability properties suitable for a vehicular interior panel.

SUMMARY

According to one aspect of the present invention, a compostable interior panel for use in a vehicle is disclosed.

In at least one embodiment, the compostable interior panel includes a core comprising an injection molded compostable polymer. The interior panel also includes an oriented layer over the compostable polymer comprising a composting-resistant polymer and having a thickness ranging from 10 μm to 175 μm. The compostable polymer and the composting resistant polymer are substantially insoluble with one another when liquid.

In another embodiment, a compostable interior panel for use in a vehicle includes an injection-molded core comprising a compostable polyester. The interior panel also includes a fountain-flowed layer encapsulating the core.

The layer is substantially impenetrable to water and comprises a biaxially-oriented thermoplastic polymer. The layer comprises 0.1 wt. % to 5 wt. % of the core.

According to one aspect of the present invention, a method for making a compostable interior panel is disclosed.

In at least one embodiment, the method includes melt-blending a mixture comprising a compostable polymer and a water impermeable polymer. A compostable polymer is insoluble with the water-impermeable polymer. The water-impermeable polymer comprises 0.1 wt. % to 5 wt. % of the mixture. The method also includes fountain-flowing the mixture into a closed mold. The interior panel is formed by solidifying the mixture, and has a core and an encapsulating layer. The interior panel includes the core comprising the compostable polymer. The layer encapsulating the core comprises the water-impermeable polymer. The interior panel is then removed from the mold.

DETAILED DESCRIPTION

Reference will now be made in detail to compositions, embodiments and methods of the present embodiments known to inventors, at least one of which includes the best mode of practicing the invention presently known. But, it should be understood that the disclosed embodiments are merely exemplary of the invention that may be embodied in various and alternative forms. Therefore, specific details disclosed herein are not to be interpreted as limiting, but merely as a representative basis for any aspect and/or as a representative basis for teaching one skilled in the art.

Except in the operating examples, or where otherwise expressly indicated, all numbers in this description indicating material amounts, reaction conditions, or uses are to be understood as modified by the word "about" in describing the disclosure's broadest scope. Practice within the numerical limits stated is generally preferred. Also, unless expressly stated to the contrary:

percent and ratio values are by weight;

the term "polymer" includes "oligomer," "co-polymer," "dimmer," terpolymer," "tetramer," and the like;

a material group or class described as suitable or preferred for a given purpose in connection with the disclosure implies any two or more of these materials may be mixed and be equally suitable or preferred;

constituents described in chemical terms refer to the constituents at the time of addition to any combination specified in the description, and does not preclude chemical interactions among mixture constituents once mixed;

an acronym's first definition or other abbreviation applies to all subsequent uses here of the same abbreviation and mutatis mutandis to normal grammatical variations of the initially defined abbreviation; and unless expressly stated to the contrary, measurement of a property is determined by the same technique as previously or later referenced for the same property.

Figure 1:
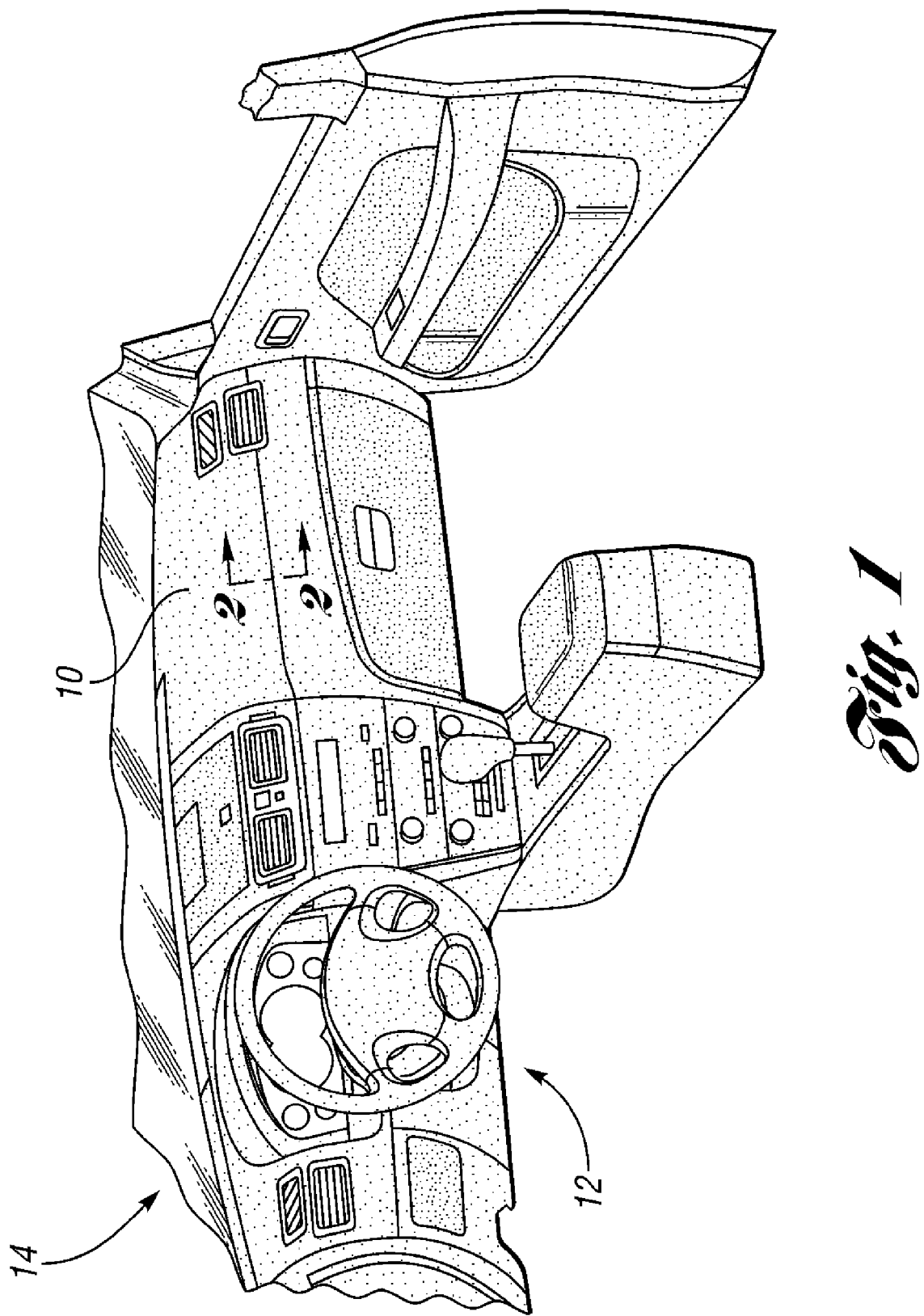
FIG. 1 schematically illustrates an interior panel of a vehicle according to at least one embodiment.

In FIG. 1, a vehicular interior panel 10, such as a dashboard 12 in a vehicle 14 according to at least one embodiment, is schematically illustrated. It should be understood that while the illustration in FIG. 1 is directed towards the dashboard 12, other interior panels, such as instrument panels, glove box door covers, console sides, console covers, pillow trim panels, shelves, trim covers, air handling vents and the like may also enjoy the benefits of the present disclosure.

Figure 2:
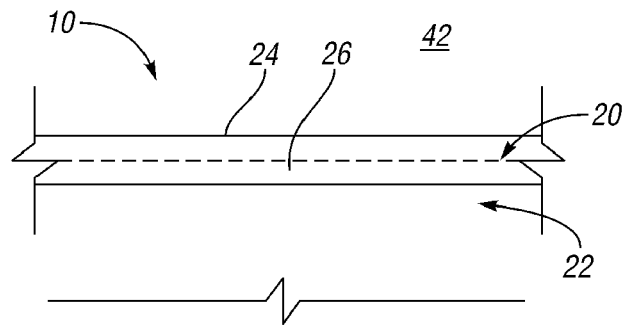
FIG. 2 schematically illustrates a fragmentary cross-sectional view of a compostable vehicular interior panel along line 2-2 of FIG. 1 according to at least one embodiment.

Turning now to FIG. 2, a fragmentary cross-sectional view of the vehicular interior panel 10 along the axis 2-2 of FIG. 1 is schematically illustrated.

In certain embodiments, skin layer 20 encapsulates core 22. In other embodiments, skin layer 20 is adjacent to a portion of core 22.

In at least one embodiment, skin layer 20 has a thickness ranging from 10 μm to 175 μm. In another embodiment, skin layer 20 has a thickness ranging from 15 μm to 100 μm. In yet another embodiment, skin layer 20 has a thickness ranging from 25 μm to 50 μm.

In at least one embodiment, skin layer 20 forms a layer substantially impenetrable to water at atmospheric pressure when measured according to ASTM F1249. In another embodiment, skin layer 20 has a permeability ranging from 0.01-0.5 g·mil/100 in²·day. In yet another embodiment, skin layer 20 has a permeability ranging from 0.05 to 0.33 g·mil/100 in²·day.

In at least one embodiment, skin layer 20 comprises an oriented layer. In another embodiment, skin layer 20 comprises a first oriented microlayer 24 and a second oriented microlayer 26. The first microlayer 24 has greater orientation than the second microlayer 26. In yet another embodiment, skin layer 20 comprises a plurality of oriented microlayers defining a decreasing gradient of orientation in the direction of the core 22. The orientation of the microlayers may also be understood as being reduced as the microlayers are disposed further away from mold surface 42 side. It is understood that skin layer 20 may be nonuniformly oriented, biaxially oriented or monoaxially oriented without exceeding the scope or spirit of the contemplated embodiments herein.

Figure 3:
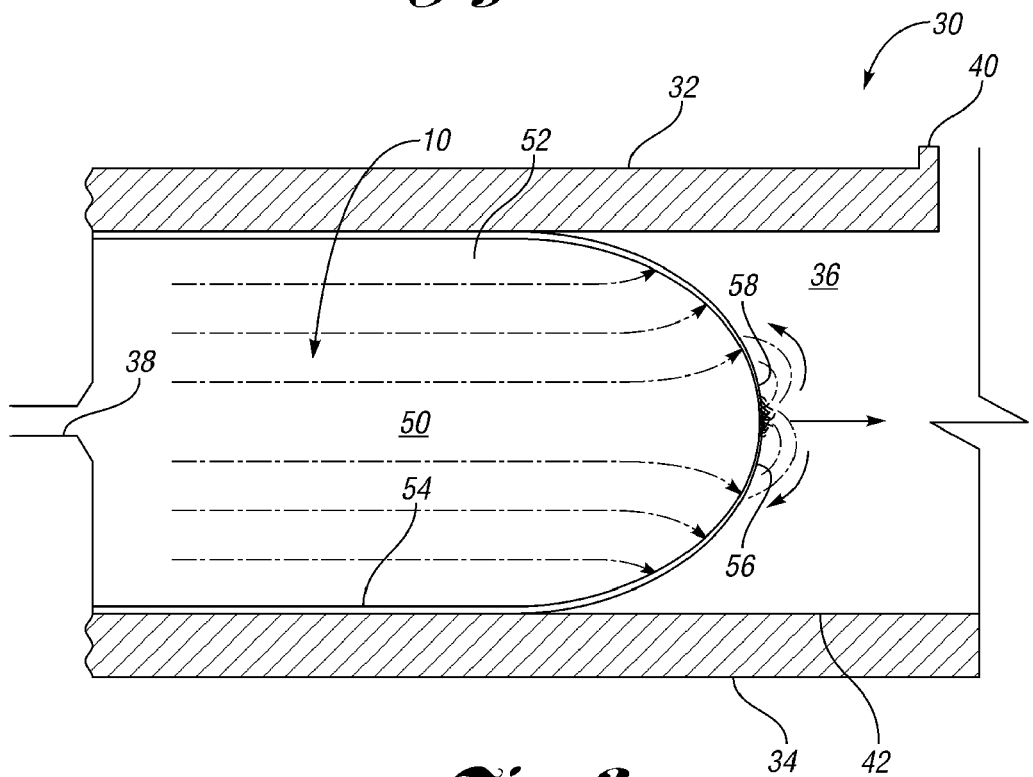
FIG. 3 schematically illustrates a fragmentary cross-sectional view of a compostable interior panel during a molding process according to at least one embodiment.

Regarding FIG. 3, a fragmentary cross-sectional view of an interior panel during molding process according to at least one embodiment is schematically illustrated. The vehicular interior panel is positioned in a mold 30 comprised of a first mold portion 32 and a second mold portion 34. The mold 30 defines a cavity 36 between the mold portions 32 and 34. Mold 30 further has an input 38, such as a gate, and an output 40, such as a vent.

A liquefied resin mixture 50 is injected into mold 30 during manufacture of vehicular interior panel 10. In at least one embodiment, liquefied resin mixture 50 comprises a resin 52, such as a host polymer, and a liquid additive 54. Resin 52 may comprise any liquefiable resin, such as a thermoplastic resin, a biodegradable resin, a compostable resin, and/or an uncured thermoset resin. Non-limiting examples of the resin 52 are bioplastic resin, compostable synthetic resin, polylactic acid-derived resin (PLA), polyhydroxybutyrate resin (PHB), polyhydroxyvalerate resin, and co-polymer resin, such as polyhydroxybutyrate-valerate (PHBV), thermoplastic polyester resin, such as a polyhydroxyalcanoate resin (PHA), polyglycolic acid resin, or polyethylene succinate terephthalate resin. It should be understood that resin 52 may be in any form known in the art, such as a neat liquid or as a master batch, without exceeding the scope and spirit of certain embodiments herein. It is further understood that even though some materials may be solids at room temperature, the materials may liquefy before being introduced at the input 38 into the cavity 36.

Liquid additive 54 may comprise a durable polymer resin, such as acyclic or branched aliphatic resin, composting-resistant resin, polyolefin resin, acrylonitrile butadiene styrene (ABS) resin, polystyrene resin, silicone resin, urethane-based resin, polyvinylidene resin, and polyamide resin. The durable polymer resin may have mechanical, environmental degradation resistance, and physical properties that exceed those of resin 52. Non-limiting examples of these improved properties may include a resistance to ultraviolet degradation, a resistance to hydrolysis, a resistance to compostability, a resistance to degradation by microbial or fungal attack, a resistance to moisture permeability, and an abrasion resistance.

Liquid additive 54 may comprise, in at least one embodiment, 0.1 wt. % to 8 wt. % of the resin content of liquid resin mixture 50. In another embodiment, liquid additive 54 may comprise 0.5 wt. % to 7 wt. % of the resin content of liquid resin mixture 50. In yet another embodiment, liquid additive 54 may comprise 1 wt. % to 5 wt. % of the resin content of liquid resin mixture 50.

In at least one embodiment, liquid additive 54 may have a number-averaged molecular weight ranging from 1000 to 150,000 since short polymer chains may improve tensile strength and impact-resistance properties.

In another embodiment, liquid additive 54 may also have significantly different properties relative to resin 52. Non-limiting examples of different properties may include a surface energy of the solidified or crystallized material and a Hansen solubility parameter. Exemplary Hansen solubility parameters are shown in Table 1.

TABLE 1

| Material | Hansen Solubility Parameter (MPa)$^{1/2}$ |
|---|---|
| Polylactic Acid | 21.7 |
| Polyamide 6 | 25.9 |
| Polystyrene | 21.6 |
| Acrylonitrile Butadiene Styrene | 19.2 |
| Polyethylene | 18.4 |
| Polyvinylidene | 19.6 |
| Polypropylene | 16.8-18.8 |

Liquid additive 54 may be relatively insoluble in resin 52. In at least one embodiment, the absolute value of the difference in the Hansen solubility parameter between resin 52 and liquid additive 54 is greater than 2. In another embodiment, the difference in the Hansen solubility parameter between resin 52 and liquid additive 54 ranges from 3 to 10. In another embodiment, the difference in the Hansen solubility parameter between resin 52 and liquid additive 54 ranges from 5 to 9.

It is understood that Hansen solubility parameters will vary with different manufacturing processes, degree of homopolymerity, degree of cross-linking, crystallinity, density, polymerization times, chain lengths, or additives such as plasticizers, colorants, stabilizers, and cross-linking agents. Such variations are contemplated within the scope and spirit of the embodiments.

Figure 4:
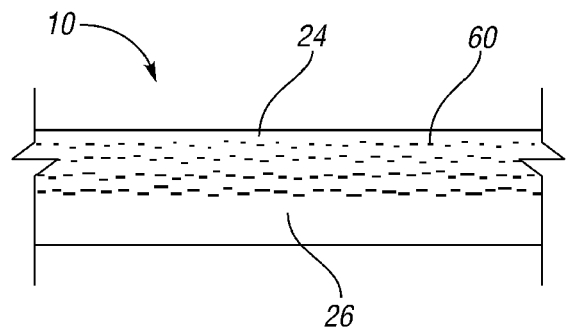
FIG. 4 schematically illustrates a fragmentary cross-sectional view of a compostable interior panel along line 2-2 of FIG. 1 according to at least one embodiment.

In another embodiment, as schematically illustrated in FIG. 4, a moisture permeation resistance additive 60 may be added to the mixture of resin 52 and liquid additive 54. In at least one embodiment, the moisture permeation resistance additive 60 is added as a solid pellet to solid resin 52, solid composting-resistant polymer 54, or solid mixtures of solid resin 52 and solid composting-resistant polymer 54. In another embodiment, the moisture permeation-resistance additive 60 may be added as a melt-blended additive into liquid resin 52, liquid composting-resistant polymer additive 54 or liquid mixtures of the resin 52 and additive 54.

In at least one embodiment, the permeation-resistance additive 60 includes a polymer-clay nanocomposite. The polymer-clay nanocomposite includes, in certain embodiments, a polyolefin polymer, such as a polypropylene polymer situated about and/or in a clay having interlamellar cavities defined by mineral laminae of the clay. The polymer-clay nanocomposite may be formed by methods known in the art.

In at least one embodiment, the clay includes finely divided clay particles having an average diameter ranging from 0.1 µm to 30 µm. In another embodiment, clay particles have the average diameter ranging from 0.5 µm to 25 µm. In yet another embodiment, clay particles having a diameter of less than 1 µm range from 15 wt. % to 35 wt. % of the particles.

In at least one embodiment, the polymer-clay nanocomposite, such as a nanoclay, includes a filler, such as a platelet filler, a filler having an average particles size less than 25 µm, or mixtures thereof.

In at least one embodiment, the average platelet breadth ranges from 0.5 μm to 5 μm. In another embodiment, the average platelet breadth ranges from 1 μm to 3 μm.

In at least one embodiment, the average platelet thickness ranges from 0.5 nm to 5 nm. In another embodiment, the average platelet thickness ranges from 0.75 nm to 3 nm.

In at least one embodiment, the platelets have an average aspect ratio ranging from 50-750. In another embodiment, the platelets have an average aspect ratio ranging from 150 to 650.

In at least one embodiment, the polymer-clay nanocomposite is included in liquid additive 54. The nanoclay is added to liquid additive 54 to form an exfoliated nanocomposite and comprising 0.5 wt. % to 5 wt. % of resin 52. In another embodiment, the polymer-clay nanocomposite comprises 1 wt. % to 3 wt. % of the mixture of resin 52.

In at least one embodiment, the clay comprises at least one phyllosilicate. Non-limiting examples of phyllosilicates include montmorillonite, wollastonite, bentonite and kaolinite.

Mixtures of resin 52 and liquid additive 54 can, in at least one embodiment, be formed into a laminated composite. The success of lamination, in certain embodiments, is assessed by the area where core 22 and skin layer 20 are neither adhesively nor cohesively bonded, i.e. core 20 and skin layer are delaminated. In at least one embodiment, the core 22 comprising substantially resin 52 and the skin layer 20 comprising substantially the liquid additive 54 have substantially no delaminations between the layers. In at least one embodiment, core 22 and skin layer 20 have delamination in less than 5% of the area between them. In another embodiment, core 22 and skin layer 20 have delamination in less than 3% of the area between them.

In certain embodiments, the resin 52 and liquid additive 54 mixture may be used with an injection molding process. The process includes setting up mold 30 having cavity 36 and a mold surface 42. Liquefied resin mixture 50 is introduced to cavity 36 through mold input 38 during an introduction time period. A stretch melting flow front 56 such as formed by fountain flow 58 in at least one embodiment covers surface 42.

Fountain flow describes the flow kinematics of the stretch melting flow front 56. Liquefied resin mixture 50, when experiencing fountain flow, follows a path moving towards the stretch melting flow front 56. Near the front 56, the liquefied resin mixture 50 may decelerate in the direction of the flow and accelerate and be stretched in a direction transverse to the direction of flow. The transverse flow may be elongational. In embodiments having elongational flow, portions of the liquefied resin mixture 50 may be oriented in the direction of the transverse flow. This portion of the liquefied resin mixture 50 may adopt the shape of the advancing stretch melting flow front 56 which may approximate a semicircular flow front.

In at least one embodiment, the portions of the liquefied resin mixture 50 that experience fountain flow will continue to follow the stretch melting flow front 56 until they reach the mold surface 42. In at least one embodiment, the portion of the liquefied resin mixture 50 encounters the relatively cold mold surface 42. The orientation of molecules in the portion of the liquefied resin mixture 50 will be oriented relatively parallel to the mold surface 42. In certain embodiments, the portion of the liquefied resin mixture 50 being oriented on the relatively cold mold surface 42 will crystallize or solidify while maintaining the relative orientation. The magnitude of the orientation depends, in certain embodiments, upon the rate of elongation. In portions of the solidifying or crystallizing liquefied resin mixture 50, portions that are ultimately distant from the mold surface 42 may not be quenched as rapidly as portions nearest the mold surface 42. As a consequence, the further material is from mold surface 42 the more likely some of the orientation relaxes during a cooling period before crystallization or solidification. As a consequence, material in the crystallized or solidified stretch melting flow front 56 may exhibit a gradient of reduced orientation the further the material is from the mold surface 42.

In at least one embodiment, the injection molding machine injection pressure during fountain flow time periods ranges from 750 lbf/in$^2$ to 3000 lbf/in$^2$. In another embodiment, the machine injection molding injection pressure during fountain flow time periods ranges from 950 lbf/in$^2$ to 2000 lbf/in$^2$.

In at least one embodiment, during fountain flow segregation of liquefied resin mixture 50 occurs during the introduction time period into a liquid additive 54 dominant portion and a resin 52 dominant portion. The liquid additive 54 dominant portion is concentrated in the stretch melting flow front 56 of FIG. 2 relative to resin 52. Liquid additive 54 dominant portion forms skin layer 20 adjacent to the mold surface 42. The resin 52 dominant portion of liquid resin mixture 50 fills a core 22 disposed adjacent to the skin layer 20 and spaced apart from the mold surface 42.

The vehicular interior panel 10 having been formed using fountain flow and comprising resin 52 is compostable and/or compostable as specified in ASTM D6400, in at least one embodiment. In another embodiment, a vehicular interior panel 10 comprising resin 52 may compostable and/or compostable if the skin layer 58 is pierced allowing resin 52 to be exposed to moisture, microbes, and fungi. In at least one embodiment, more than 80 wt. % of the core 22 composts within a year when shredded as measured according to ASTM D6400. In another embodiment, more than 80 wt. % of the core 22 composts within 180 days when shredded. In yet another embodiment, more than 80 wt. % of the core 22 composts within 90 days when shredded.

Figure 5:
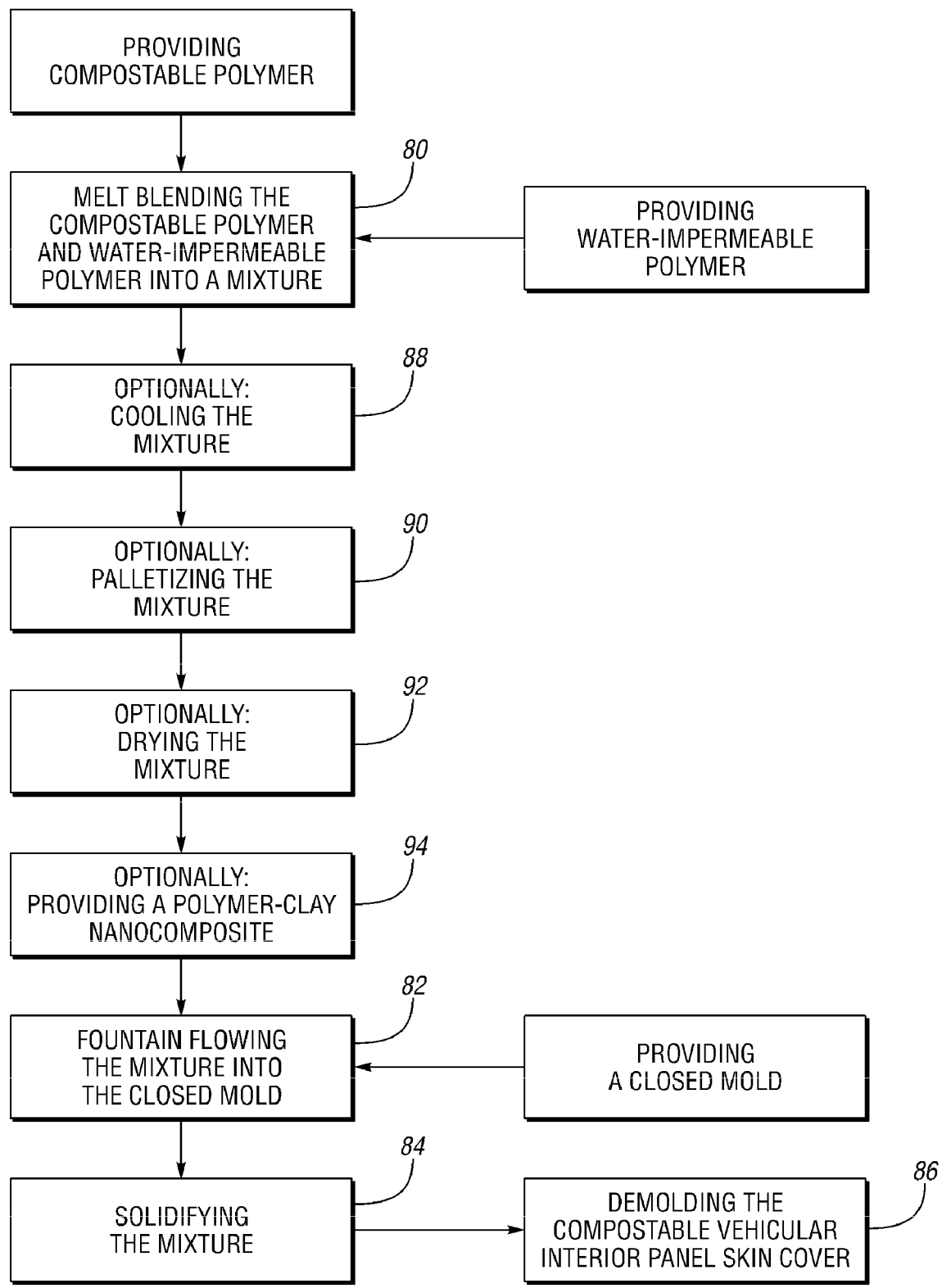
FIG. 5 schematically illustrates a flow diagram according to at least one embodiment.

In FIG. 5, a diagram illustrates the method for making a compostable interior panel. In step 80, a mixture comprising the compostable polymer and a water-impermeable polymer is melt blended. The compostable polymer is insoluble with the water-impermeable polymer. The water-impermeable polymer comprises 0.1 wt. % to 5 wt. % of the mixture. In step 82, the mixture is introduced to a closed mold in such a manner as to create fountain flowing of the mixture. When the mold cavity 36 is filled, in step 84 the mixture is solidified or crystallized to the mold 30. The closed mold is opened and the compostable interior panel is removed in step 86.

It should be understood that the mixture of step 80 may be directly injected into the closed mold or, optionally, be pelletized by steps 88, 90 and 92, in certain embodiments. In another embodiment, the polymer-clay nanocomposite 60 may be provided in step 94.

While the best mode for carrying out the disclosure has been described in detail, those familiar with the art to which these embodiments relate will recognize various alternative designs and embodiments for practicing the embodiments as defined by the following claims.

What is claimed:

1. A compostable interior panel for use in a vehicle, comprising:
    core comprising a compostable polyester composition capable of being a solid or a liquid; and
    a layer including a thermoplastic polymeric composition capable of being a liquid or a solid, the thermoplastic polymeric composition having a permeability to moisture ranging from 0.01 g·mil/100 in2·day to 0.5 g·mil/100 in$^2$ day, when measured according to ASTM F1249, the layer having an exterior surface and an interior surface adjacent to the core, the layer being orientable and encapsulating the core when both compositions are solid, wherein the layer comprises a stretch melting flow front encapsulating the core when both compositions are liquids under pressure ranging from 750 lbf/in$^2$ to 3000 lbf/in$^2$, the layer, when solid, having a gradient of decreasing orientation from the exterior surface to the interior surface.

2. The compostable interior panel of claim 1, wherein the layer includes a polymer-clay nanocomposite.

3. The compostable interior panel of claim 1, wherein the compostable polyester comprises polylactic acid.

4. The compostable interior panel of claim 1, wherein the layer protects the core from composting.

5. The compostable interior panel of claim 1, wherein the thermoplastic polymer is a polyolefin.

6. The compostable panel of claim 1, wherein the thermoplastic polymeric composition has a number-averaged molecular weight ranging from 1000 to 150,000.

7. The compostable panel of claim 1, wherein the layer comprises a range from 0.1 wt. % to 5 wt. % of the core.

8. The compostable panel of claim 1, wherein the layer includes a first oriented microlayer having a first degree of biaxial orientation and a second oriented microlayer having a second degree of orientation and being disposed closer to the core than the first microlayer, the first degree of biaxial orientation being greater than the second degree of orientation.

9. The compostable panel of claim 1, wherein the panel is selected from a group consisting of a dashboard, an instrument panel, a glove box door cover, a console side, a pillow trim panel, a shelf, a trim cover, and an air handling vent.

10. The compostable panel of claim 1, wherein the layer is bonded to the core forming a laminated composite with a bond surface between the layer and the core, the bond surface having an area.

11. The compostable panel of claim 10, wherein the area of the bond surface is delaminated in less than 5% of the area.

12. A compostable interior panel for use in a vehicle, the panel comprising:
  a core including a bioplastic resin composition capable of being a solid or a liquid; and
  a layer including a plastic composition capable of being a solid or a liquid, the plastic composition having a permeability ranging from 0.05 g·mil/100 in$^2$·day to 0.33 g·mil/100 in$^2$·day, when measured according to ASTM F1249, the layer forming, when solid, a first microlayer having a first degree of orientation and a second microlayer having a second degree of orientation, the second microlayer being adjacent to the core, the first degree of orientation being greater than the second degree of orientation, the layer encapsulating the core and when both compositions are solids, the layer comprising a stretch melting flow front encapsulating the core, when both compositions are liquids under pressure.

13. The panel of claim 12, the resin composition is a compostable resin composition when measured according to ASTM D6400.

14. The panel of claim 13, wherein the compostable resin composition composts within one year when shredded.

15. The panel of claim 12, wherein the layer includes a nanocomposite.

16. The panel of claim 15, wherein the nanocomposite is polyolefin-clay nanocomposite.

17. A compostable interior panel for use in a vehicle, the panel comprising:
  a core including a compostable bioplastic resin composition capable of being a solid or a liquid; and
  a layer including a plastic composition capable of being a solid or a liquid and having a number-averaged molecular weight range from 1000 to 150,000, the layer encapsulating the core when both compositions are solids, the layer comprising a stretch melting flow front encapsulating the core, when both compositions are liquids under pressure ranging from 750 lbf/in$^2$ to 3000 lbf/in$^2$.

18. The panel of claim 17, wherein the resin has a first Hansen solubility parameter and the plastic composition has a second Hansen solubility parameter, wherein the difference between the first and second Hansen solubility parameters is greater than 2.

19. The panel of claim 17, wherein the layer further comprises a moisture permeation resistance additive.

20. The panel of claim 19, wherein the moisture permeation resistance additive is present in an amount ranging from 0.5 wt. % to 5 wt. % of the core.

\* \* \* \* \*